(12) United States Patent
Chen

(10) Patent No.: US 9,983,346 B2
(45) Date of Patent: May 29, 2018

(54) BACKLIGHT MODULE AND LIGHT GUIDE PLATE THEREOF

(71) Applicants: DARFON ELECTRONICS (SUZHOU) CO., LTD., Suzhou (CN); DARFON ELECTRONICS CORP., Taoyuan County (TW)

(72) Inventor: Yen-Chang Chen, Taoyuan County (TW)

(73) Assignees: DARFON ELECTRONICS (SUZHOU) CO., LTD., Suzhou (CN); DARFON ELECTRONICS CORP., Taoyuan County (TW)

( * ) Notice: Subject to any disclaimer, the term of this patent is extended or adjusted under 35 U.S.C. 154(b) by 4 days.

(21) Appl. No.: 15/217,691

(22) Filed: Jul. 22, 2016

(65) Prior Publication Data

US 2017/0052309 A1    Feb. 23, 2017

(30) Foreign Application Priority Data

Aug. 21, 2015  (TW) .............................. 104127408 A

(51) Int. Cl.
*F21V 7/04*    (2006.01)
*F21V 8/00*    (2006.01)
*G06F 3/02*    (2006.01)

(52) U.S. Cl.
CPC ......... *G02B 6/0058* (2013.01); *G02B 6/0021* (2013.01); *G02B 6/0055* (2013.01); *G06F 3/0202* (2013.01)

(58) Field of Classification Search
CPC .. G02B 6/0021; G02B 6/0035; G02B 6/0036; G02B 6/0041; G02B 6/0058
See application file for complete search history.

(56) References Cited

U.S. PATENT DOCUMENTS 7,543,971 B2 * 6/2009 Lee ..................... G02B 6/0018
                                                        362/23.19
2006/0092619 A1  5/2006 Hsu et al.
2008/0007964 A1  1/2008 Lin
(Continued)

FOREIGN PATENT DOCUMENTS

CN          2745289        12/2005
CN         201170996 Y    12/2008
(Continued)

*Primary Examiner* — Alexander Garlen
(74) *Attorney, Agent, or Firm* — Innovation Capital Law Group, LLC; Vic Lin

(57) ABSTRACT

A backlight module includes a light source unit for providing light, a light guide plate including a plate body having a light entrance surface and extending along an X-Y plane and at least one opening in the plate body and extending along a Z axis, and an optical layer on one side of the light guide plate. The light enters the light guide plate from the light entrance surface and travels substantially along the X-Y plane. A cross section of the opening on the X-Y plane is a taper shape with a base region and a cone shape region extending from one side of the base region near the light source unit. The optical layer has a through hole aligned and communicating with the base region. A projection of the cone shape region along the Z axis on the optical layer is at least partially outside the through hole.

12 Claims, 15 Drawing Sheets

(56) References Cited

U.S. PATENT DOCUMENTS

| | | | |
|---|---|---|---|
| 2009/0256726 A1* | 10/2009 | Tsai | G02B 6/0043 341/22 |
| 2010/0265184 A1* | 10/2010 | Jung | G06F 1/1624 345/169 |
| 2012/0140519 A1 | 6/2012 | Sakai | |
| 2014/0177274 A1 | 6/2014 | Chen et al. | |
| 2014/0340866 A1 | 11/2014 | Chen et al. | |

FOREIGN PATENT DOCUMENTS

| | | |
|---|---|---|
| CN | 201897094 U | 7/2011 |
| CN | 102597605 A | 7/2012 |
| CN | 103791449 A | 5/2014 |
| TW | 200804871 A | 1/2008 |
| TW | M350727 U | 2/2009 |
| TW | M482759 | 7/2014 |
| TW | M496840 | 1/2015 |
| TW | M527120 | 8/2016 |

\* cited by examiner

BACKLIGHT MODULE AND LIGHT GUIDE PLATE THEREOF

BACKGROUND OF THE INVENTION

1. Field of the Invention

The invention generally relates to a backlight module and a light guide plate thereof. Particularly, the invention relates to a backlight module and a light guide plate suitable for keyboard of laptop computer to reduce light leakage.

2. Description of the Prior Art

As the technology advances and the specifications of the laptop computer become more critical, backlit keyboards have gradually become the major input device of the laptop computer. The backlit keyboard generally includes a keyswitch module on top and a backlight module on the bottom. The size of the backlight module is very close to that of the keyswitch module, so that the backlight module can be distributed under the keyswitch module to provide uniform brightness for different areas of the entire keyboard.

However, (1) in order to allow air to more smoothly flow from below the backlight module to above the backlight module so as to prevent the backlight module from obstructing the heat dissipation of the heat sources of the laptop computer (e.g. microprocessor, north/south bridge chip set, video chipset), (2) in order to mount the entire backlit keyboard on the laptop computer by screws that penetrate the backlight module, or (3) in order to form a plurality of recesses or openings on the backlight module to fulfill the mechanical design, the backlight module generally has a plurality of heat dissipation holes, screw holes, or openings. However, as shown in FIGS. 1A and 1B, the heat dissipation hole or screw hole 1010 of the conventional backlight module 1000 is a perfectly aligned and integrated through hole constituted by circular holes 1001~1003 of different layers, resulting in large amount of light entering the circular through hole 1010 and leaking from the circular through hole 1010. Consequently, the light leaking from the circular through hole 1010 will cause non-uniform brightness distribution across the entire keyboard. For example, the character shown on the keycap near the through hole 1010 is brighter than the characters on keycaps at other locations.

Therefore, how to effectively improve the light leakage from the through hole or the recessed opening is an important issue.

SUMMARY OF THE INVENTION

On object of the invention is to provide a light guide plate, which changes the direction of light by the cone shape structure of the opening to improve the leakage of light.

Another object of the invention is to provide a backlight module for keyboard, which has an opening with a cone shape region including inclined edges in the horizontal direction to significantly reduce the light refracted into the opening, so as to reduce the leakage of light from the opening and improve the uniformity of brightness of the keyboard.

In an embodiment, the invention provides a light guide plate for receiving light from a light source unit. The light guide plate includes a plate body substantially extending along an X-Y plane, a normal direction to the X-Y plane being a Z axis, the plate body having a light entrance surface, the light entering the light guide plate from the light entrance surface and traveling substantially along the X-Y plane; and at least one opening formed in the plate body, the opening extending along the Z axis, a cross section of the opening on the X-Y plane being a taper shape and having a base region and a cone shape region, wherein the cone shape region extends from one side of the base region and is positioned between the light entrance surface and the base region.

In an embodiment, the cone shape region has a vertex angle in a range of 30~45 degrees.

In an embodiment, the base region has a central point. A straight line running through the central point and a middle point of the light entrance surface defines a light leakage path. The cone shape region has a vertex centerline. An included angle between the vertex centerline and the light leakage path is smaller than 90 degrees.

In an embodiment, the base region has a circular shape. The central point is the center of the circular shape. The light leakage path is defined by the straight line running through the center of the circular shape and the middle point of the light entrance surface.

In an embodiment, the base region has an ellipse shape. The central point is the center of the ellipse shape. The light leakage path is defined by the straight line running through the center of the ellipse shape and the middle point of the light entrance surface.

In an embodiment, the base region has a polygon shape with smooth vertices. The central point is the geometric center of the polygon shape. The light leakage path is defined by the straight line running through the geometric center of the polygon shape and the middle point of the light entrance surface.

In an embodiment, the cone shape region includes two inclined edges and a vertex. The base region has the circular shape. The two inclined edges are substantially two tangent lines of the circular shape and the vertex is defined by the two inclined edges.

In an embodiment, the light guide plate further includes an ink layer, wherein the ink layer is coated on the plate body along the X-Y plane and surrounds the opening.

In an embodiment, the light guide plate further includes a light source hole, wherein the light source hole is formed in the plate body for accommodating the light source unit. The light entrance surface is an inner side wall of the plate body within the light source hole.

In another embodiment, the invention provides a backlight module, which includes a light source unit for providing a light, a light guide plate, and a first optical layer. The light guide plate includes a plate body substantially extending along an X-Y plane and at least one opening formed in the plate body. A normal direction to the X-Y plane is a Z axis. The plate body has a light entrance surface. The light enters the light guide plate from the light entrance surface and travels substantially along the X-Y plane. The opening extends along the Z axis; a cross section of the opening on the X-Y plane is a taper shape with a base region and a cone shape region, wherein the cone shape region extends from one side of the base region and is positioned between the light source unit and the base region. The first optical layer is disposed on one side of the light guide plate and has a first through hole aligned with the base region, wherein a projection of the cone shape region along the Z axis on the first optical layer is at least partially outside the first through hole.

In an embodiment, the backlight module further includes a second optical layer disposed on another side of the light guide plate opposite to the first optical layer, wherein the second optical layer has a second through hole aligned with the first through hole; a projection of the cone shape region along the Z axis on the second optical layer is at least partially outside the second through hole.

In an embodiment, the first optical layer is one of a reflective layer and a mask layer, and the second optical layer is the other one of the reflective layer and the mask layer.

In an embodiment, the base region has a circular shape, an ellipse shape, or a polygon shape with smooth vertices. When the base region has the circular shape, the central point is the center of the circular shape. When the base region has the ellipse shape, the central point is the center of the ellipse shape. When the base region has the polygon shape, the central point is the geometric center of the polygon shape.

In an embodiment, the light guide plate further includes a first light source hole. The first optical layer further includes a second light source hole, which is aligned and communicates with the first light source hole. The light source unit includes a light-emitting element penetrating through the second light source hole and extending into the first light source hole.

In an embodiment, the opening is formed penetrating through the plate body along the Z axis. The first though hole is aligned and communicates with the base region, so that an external fixing unit can penetrate through the first through hole and the base region.

DETAILED DESCRIPTION OF THE PREFERRED EMBODIMENT

Figure 1A:
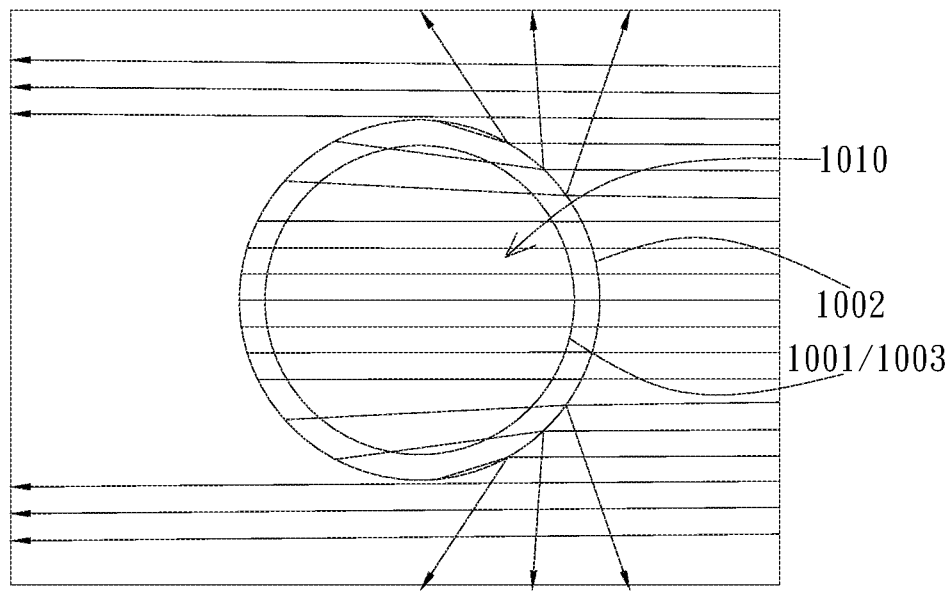
FIGS. 1A and 1B are respectively a cross-sectional view and a side view showing the light traveling in the conventional backlight module.
Figure 1B:
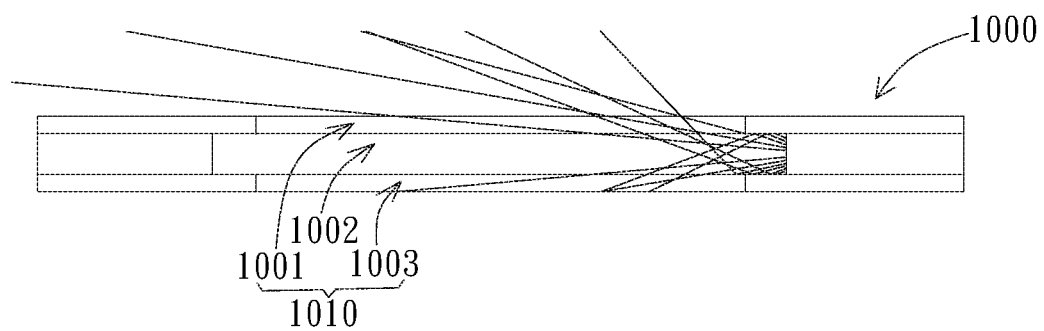
Figure 2:
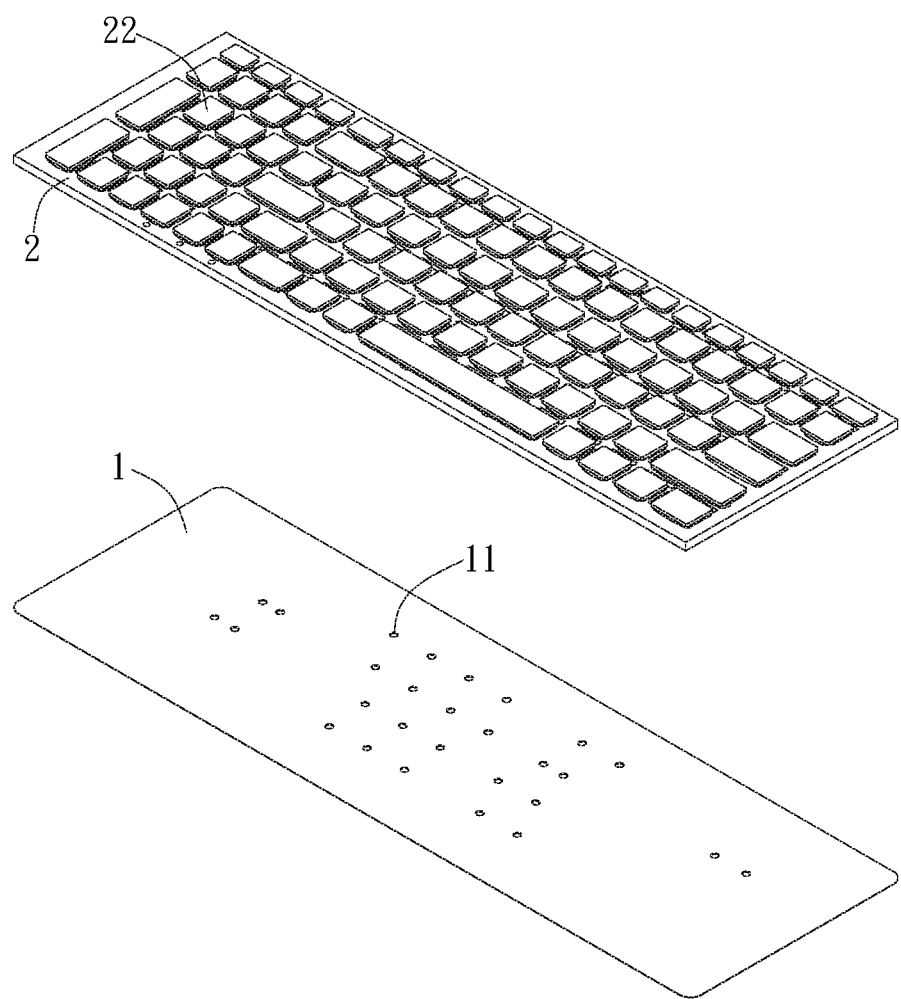
FIG. 2 is a schematic view of the backlit keyboard having the backlight module of the invention and the keyswitch module.

The invention provides a backlight module and a light guide plate thereof, particularly a backlight module and a light guide plate for reducing light leakage. The backlight module of the invention can be applied to, for example, a backlit keyboard, particularly the backlit keyboard of laptop computer. The backlight module includes a light guide plate having openings with taper-shaped cross-section to reduce the leakage of light from holes for heat dissipation, screw holes, or recessed openings, thus improving the uniformity of brightness of the keyboard, but not limited thereto. For example, as shown in FIG. 2, the backlit keyboard includes a backlight module 1 of the invention and a keyswitch module 2. The backlight module 1 is disposed under the keyswitch module 2 and includes a plurality of holes or openings 11 for heat dissipation or for inserting screws, fixing units, etc. The keyswitch module 2 includes a plurality of keys 22 and can be any suitable keyswitch module with light-transparent keycaps. In this embodiment, the number and locations of the holes or openings 11 can be modified according to the heat dissipation or arrangement requirements of the electronic device (e.g. laptop computer), not limited to the embodiment. For example, closer to the heat sources of the laptop computer, the arrangement of the holes or openings 11 is denser for heat dissipation. Hereinafter, the backlight module and the light guide plate of the invention will be described in detail with reference to the drawings.

Figure 3A:
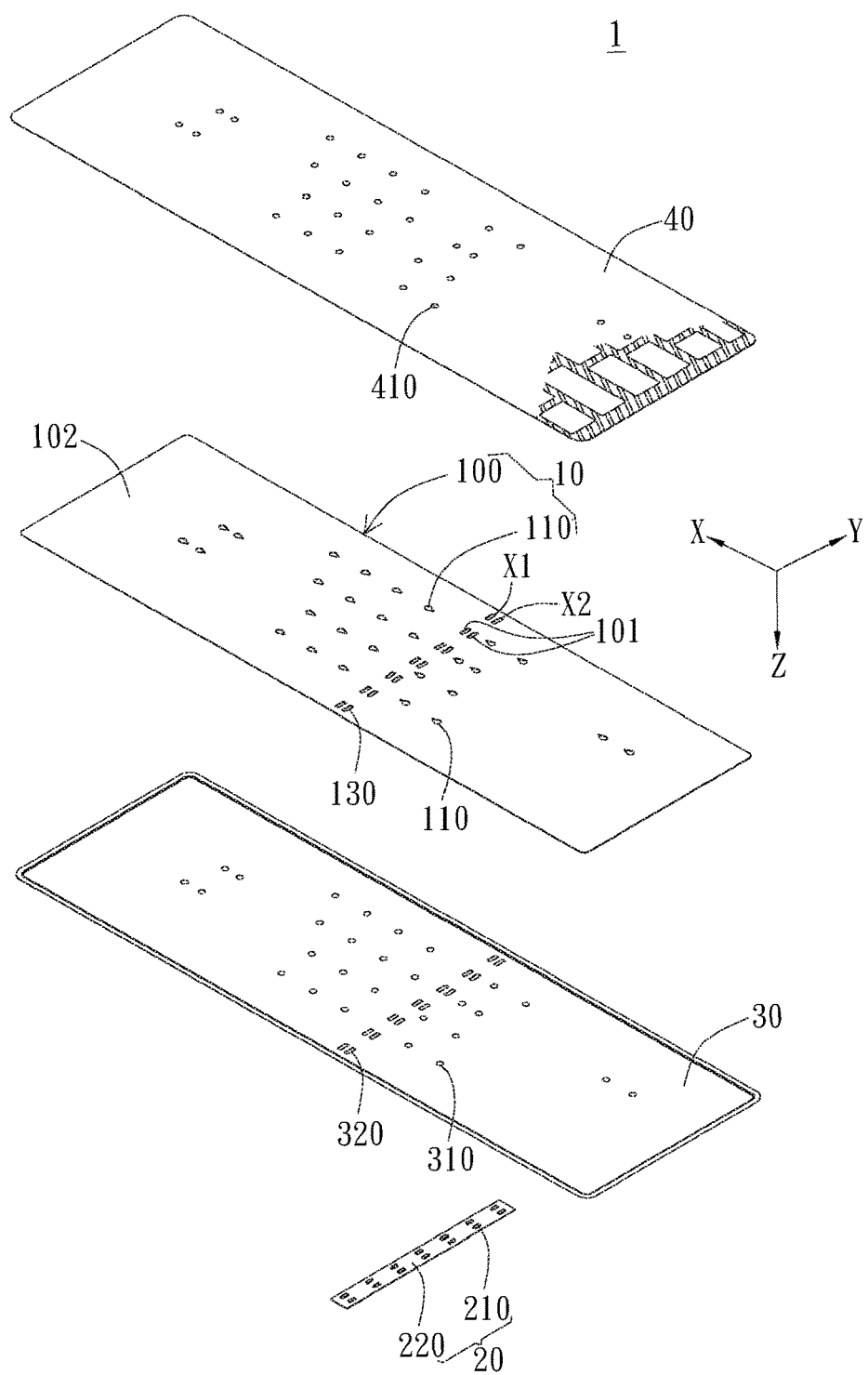
FIGS. 3A and 3B are respectively an exploded view and a partial cross-sectional view of the backlight module in an embodiment of the invention.
Figure 3B:
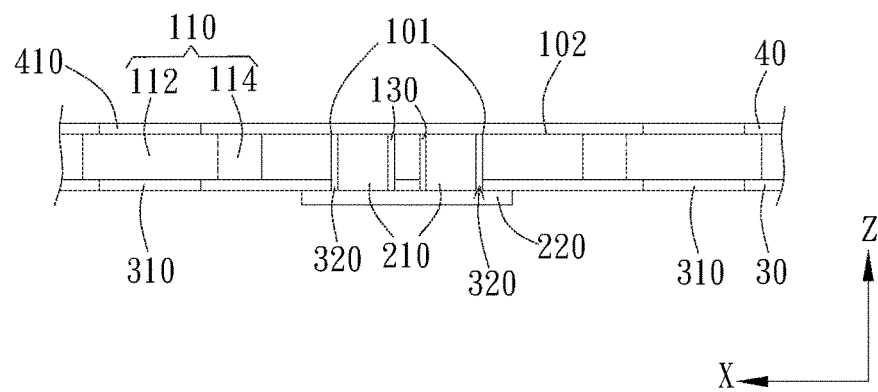

As shown in FIGS. 3A and 3B, the backlight module 1 includes a light guide plate 10, a light source unit 20, a reflective layer 30, and a mask layer 40. The light source unit 20 is configured to provide light to the light guide plate 10. The reflective layer 30 is disposed on one side of the light guide plate 10 (e.g. the bottom side). The mask layer 40 is disposed on another side of the light guide plate 10 opposite to the reflective layer 30 (e.g. the top side). Specifically, the light source unit 20 preferably includes a plurality of light-emitting elements 210 and a circuit board 220. The light-emitting elements 210 can be light-emitting diodes (LEDs) for providing light to the light guide plate 10, wherein the side-lighting LEDs are more preferred. The circuit board 220 is preferably a flexible printed circuit board, but not limited thereto. In other words, the plurality of light-emitting elements 210 are integrated with the circuit board 220 to form the integral light source unit 20 to facilitate the assembly efficiency.

The light guide plate 10 is configured to receive the light emitted from the light source unit 20. The light guide plate 10 includes a plate body 100 and at least one opening 110 formed in the plate body 100. The plate body 100 can be a plate or a sheet made of any suitable optical materials (e.g. optical polymers) and substantially extends along the X-Y plane, wherein a normal direction to the X-Y plane is the Z axis. In this embodiment, the Z direction is the thickness direction of the plate body 100, and the dimension of the plate body 100 in the direction along the X or Y axis is greatly larger than the dimension in the direction along the Z axis, so that the plate body 100 is in the form of a thin plate or thin film. The plate body 100 is preferably a rectangular plate and the size thereof preferably corresponds to that of the keyswitch module 2. The plate body 100 has a light entrance surface 101 parallel to the Y-Z plane and a light exit surface 102 extending along the X-Y plane. The light provided by the light source unit 20 enters the light guide plate 10 from the light entrance surface 101 and then travels substantially along the X-Y plane to be emitted out from the light exit surface 102. Particularly, the light-emitting elements 210 of the light source unit 20 provide light into the light guide plate 10 through the light entrance surface 101, and then the light travels substantially along the X-Y plane and out of the light guide plate 10 from the light exit surface 102, i.e., top surface of the light guide plate 10.

Figure 3C:
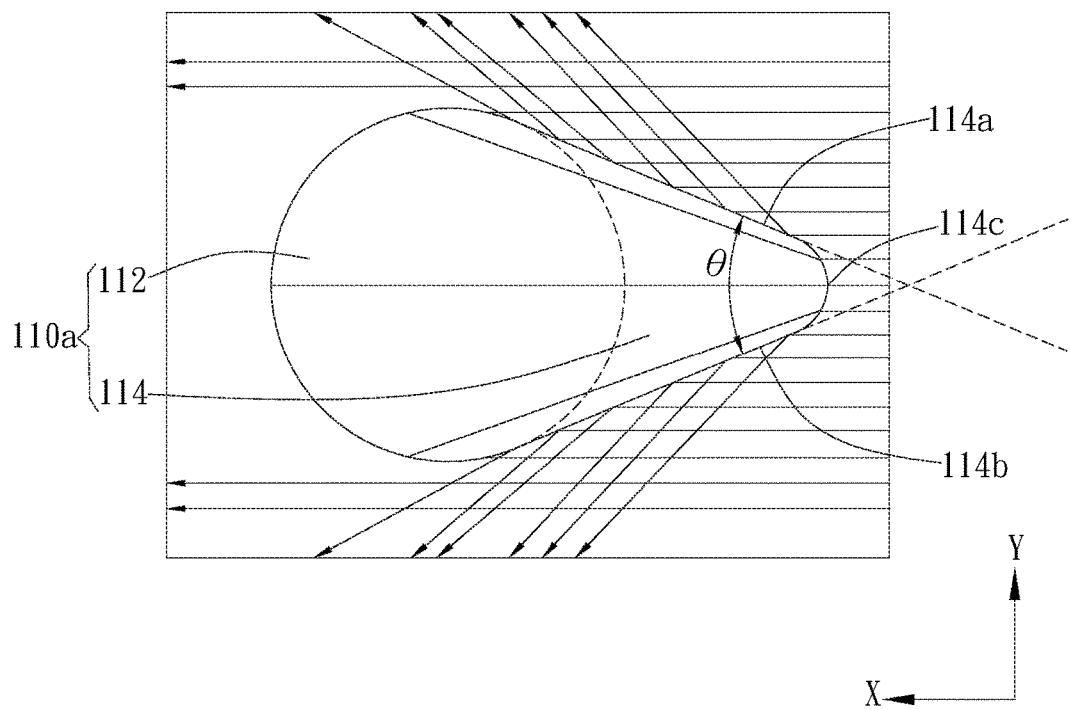
FIG. 3C is a cross-sectional view of the opening according to an embodiment of the invention.

At least one opening 110 is formed in the plate body 100. In an embodiment, the opening 110 extends along the Z axis to be a recessed opening in the plate body 100, i.e. a blind hole. In another embodiment, as shown in FIG. 3B, the opening 110 penetrates the plate body 100 along the Z axis to be a through hole. As shown in FIG. 3C, a cross section 110a of the opening 110 on the X-Y plane is a taper shape, wherein the taper-shaped cross section 110a has a base region 112 and a cone shape region 114. The cone shape region 114 extends from one side of the base region 112 and is positioned between the light source unit 20 (i.e. the light-emitting element 210) and the base region 112. That is, the cone shape region 114 communicates with the base region 112 and is located closer to the light source unit 20. Particularly, the opening 110 can be an opening formed by mechanical processing on the X-Y plane of the plate body 100 or by the molding process. The opening 110 is disposed in a manner that the cone shape region 114 of the taper-shaped cross section 110a is closer to the light entrance surface 101 than the base region 112 is. In other words, on the light exit surface 102 that is parallel to the X-Y plane, the opening 110 has the taper-shaped cross section 110a, wherein the taper-shaped cross section 110a has a wider width at the base region 112, which is further away from the light entrance surface 101, and the width is gradually reduced from one side of the base region 112 toward the light entrance surface 101 to make the cone shape region 114 be a triangle-like cross-section. In this embodiment, the base region 112 of the taper-shaped cross section 110a preferably has a circular shape, and the cone shape region 114 includes two inclined edges 114a, 114b and a vertex 114c. The two inclined edges 114a, 114b are substantially two straight lines, which obliquely extend toward the same direction and connect each other to form the vertex 114c. In other words, when the base region 112 has a circular shape, the two inclined edges 114a, 114b are preferably substantially two tangent lines of the circular shape and the vertex 114c is defined by the two inclined edges 114a, 114b, so that the taper-shaped cross section 110a has a droplet shape or a cone ice cream shape, but not limited thereto.

Figure 4A:
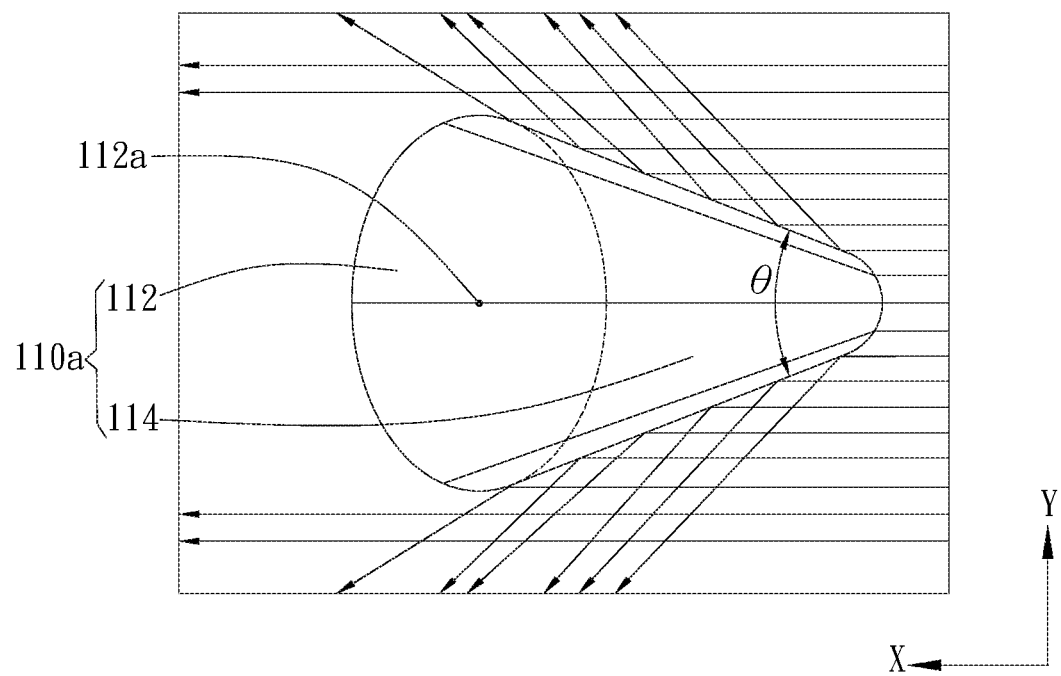
FIGS. 4A to 4C are cross-sectional views of the opening of other embodiments.
Figure 4B:
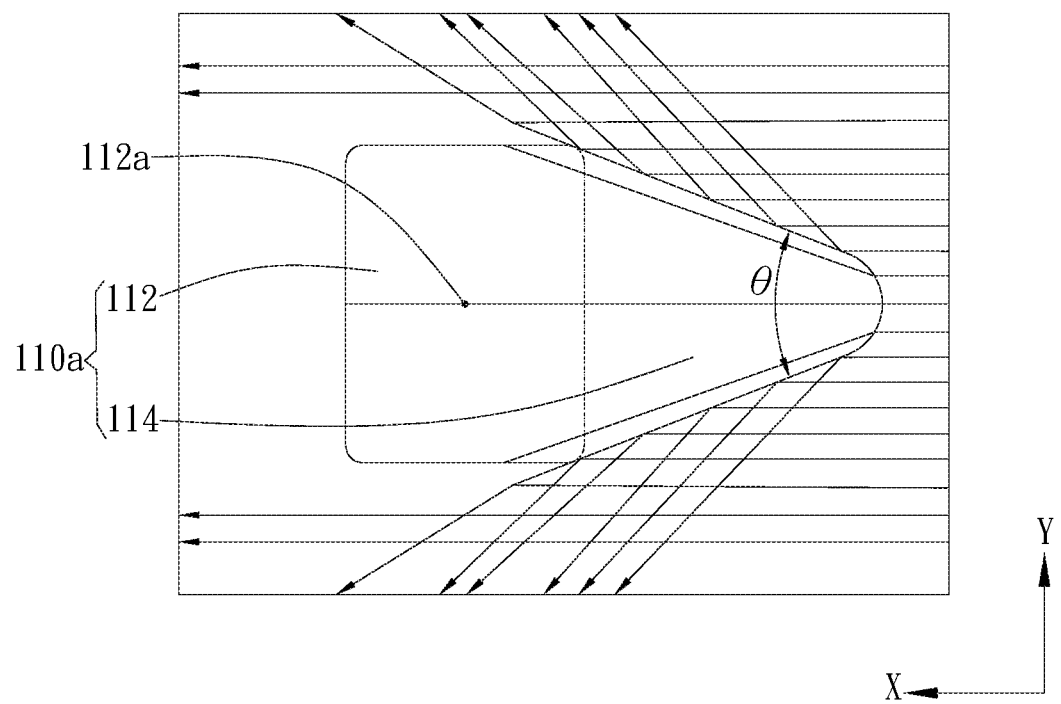
Figure 4C:
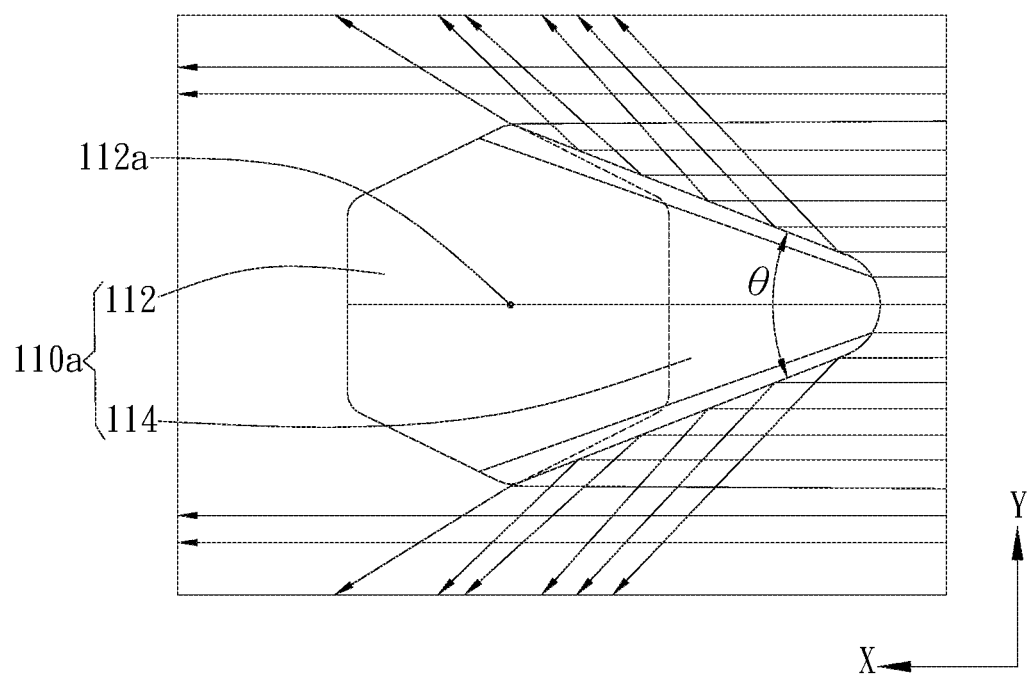

As shown in FIGS. 4A to 4C, in other embodiments, according to practical requirements, the base region 112 of the taper-shaped cross section 110a can have a geometric shape with smooth vertices (ellipse, rectangle, hexagon, etc.), so that the taper-shaped cross section 110a has a taper shape with non-circular base region. The vertices of the geometric shape are preferably formed by smooth curves without sharp angle. That is, the boundary of the base region 112 preferably has no corner that is intersection of two straight lines, so that no light will be condensed on the corner formed by intersection of two straight lines in the opening of the light guide plate, and thus the backlight at the corner will not be brighter than the other non-corner portion. Moreover, as shown in FIGS. 3C and 4A to 4C, the two inclined edges 114a, 114b of the cone shape region 114 preferably have the same length, but not limited thereto. In another embodiment, according to practical applications, the two inclined edges 114a, 114b of the cone shape region 114 may have different lengths.

The angle θ of the vertex 114c is preferably in a range of 30~45 degrees, so that the light that enters from the light entrance surface 101 and travels along the X axis direction will be reflected by the inclined edges 114a, 114b away from the opening 110. Therefore, the light entering the opening 110 is significantly decreased, so as to reduce the light leaking from the opening 110. It is noted that the vertex 114c can be a sharp corner formed by intersecting the two inclined edges 114a, 114b or a round corner formed by connecting the two inclined edges 114a, 114b with a curved boundary, wherein the round corner is preferred. When the vertex 114c is a sharp corner, the angle θ of the vertex 114c is defined as the included angle between the two intersected inclined edges 114a, 114b. When the vertex 114c is a round corner, the angle θ of the vertex 114c is defined as the angle formed by intersecting the extension directions of the two inclined edges 114a, 114b. The location and number of the openings 110 can be modified according to the heat dissipation requirement of the electronic device, and not limited to the embodiment. For example, closer to the heat sources of the laptop computer, the arrangement of the openings 110 is generally denser for heat dissipation.

Figure 5A:
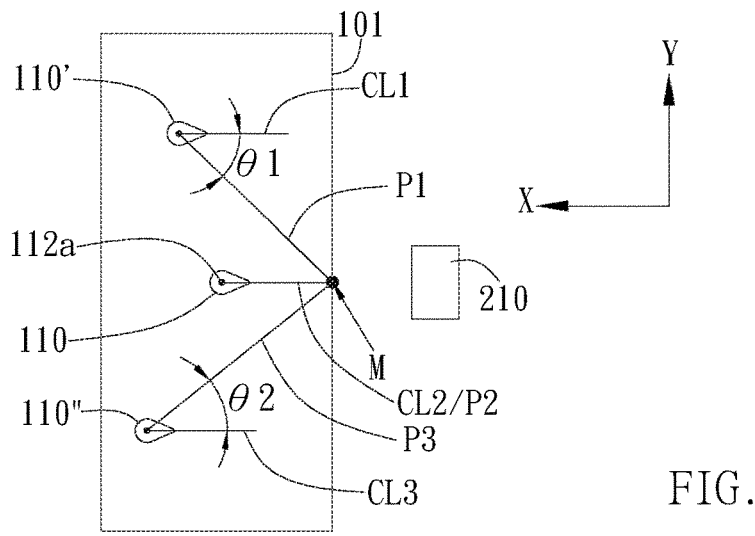
FIGS. 5A to 5C are schematic views showing the arrangement of the openings of different embodiments.

As shown in FIG. 5A, each base region 112 has a central point 112a, and the light entrance surface 101 has a middle point M neighboring to the center of the light source 210. The straight line running through one central point 112a and the middle point M defines a light leakage path, such as P1~P3. For example, when the shape of the base region 112 is circular, the central point 112a is the center of the circular shape, and the straight line running through the center 112a and the middle point M of the light entrance surface 101 defines one light leakage path, such as either one of P1~P3. When the base region 112 has other suitable shapes (as shown in FIGS. 4A~4C), the central point 112a of the base region 112 is the geometric center of the base region 112, and the straight line running through the geometric center and the middle point M of the light entrance surface 101 defines one light leakage path. For example, as shown in FIG. 4A, the base region 112 has an ellipse shape, and the central point 112a is the center of the ellipse shape. The light leakage path is defined by the straight line running through the center of the ellipse shape and the middle point M of the light entrance surface 101. As shown in FIGS. 4B~4C, the base region 112 has a polygon shape with smooth vertices (such as rectangular shape, hexagonal shape). The central point 112a is the geometric center of the polygon shape, and the light leakage path is defined by the straight line running through the geometric center of the polygon shape and the middle point M of the light entrance surface 101.

The cone shape region 114 has a vertex centerline, such as CL1~CL3. An included angle (e.g. θ1, θ2) between the vertex centerline and the light leakage path is smaller than 90 degrees. In other words, the cone shape region 114 is closer to the light entrance surface 101 than the base region 112 is, i.e. the cone shape region 114 is positioned between the light entrance surface 101 and the base region 112. Moreover, the cone shape region 114 can be slanted or parallel with respect to the normal direction (i.e. X axis direction) of the light entrance surface 101. For example, as shown in FIG. 5A, there are three openings 110, 110', 110" formed on the plate body 100, wherein the opening 110 is right facing to the middle point M of the light entrance surface 101 (positioned on an X axis direction line intersecting the middle point M), while the openings 110', 110" are disposed on two opposite sides of the opening 110, respectively. In this embodiment, the vertex centerlines CL1~CL3 of the openings 110', 110, 110" are all parallel to the normal direction (i.e. X axis direction) of the light entrance surface 101. Particularly, the vertex centerline CL2 of the opening 110 overlaps the light leakage path P2, i.e. the vertex of the cone shape region 114 is straightly directed to the middle point M of the light entrance surface 101, and the angle between the vertex centerline CL2 and the light leakage path P2 is zero degrees, so that the extension of the vertex centerline CL2 can intersect with the middle point M of the light entrance surface 101. The angle θ1 between the vertex centerline CL1 of the opening 110' and the light leakage path P1, and the angle θ2 between the vertex centerline CL3 of the opening 110" and the light leakage path P3 both are smaller than 90 degrees.

Figure 5B:
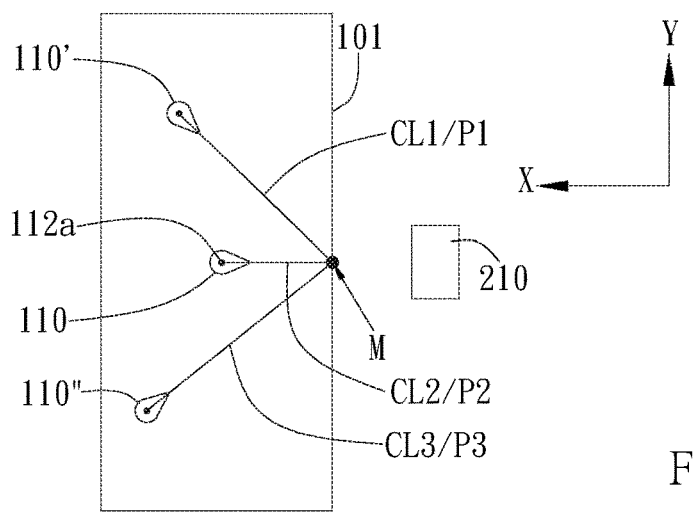

In another embodiment, as shown in FIG. 5B, the vertex centerline CL2 of the opening 110 is parallel to the normal direction (i.e. X axis direction) of the light entrance surface 101, while the vertex centerlines CL1, CL3 of the openings 110', 110" are slanted with respect to the normal direction (i.e. X axis direction) of the light entrance surface 101, so that the vertex centerlines CL1, CL2, CL3 of the openings 110', 110, 110" overlap the light leakage paths P1, P2, P3, respectively, and the extensions of the vertex centerlines CL1~CL3 will intersect with the middle point M of the light entrance surface 101. In other words, the longitudinal axis of the openings 110', 110" are slanted with respect to the normal direction (i.e. X axis direction) of the light entrance surface 101, so that the straight extension of both vertex centerlines CL1 and CL3 intersect with the middle point M of the light entrance surface 101.

Figure 5C:
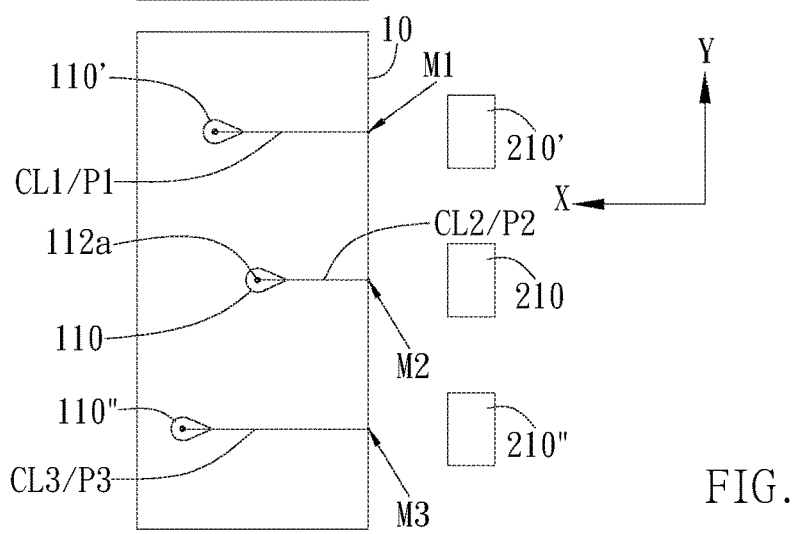

In FIGS. 5A and 5B, only one light source 210 is positioned neighboring to the center point of the light entrance surface 101, so the middle point M of the light entrance surface 101 is defined as the middle point on the Y axis of the side surface of the plate body 100. In another embodiment, as shown in FIG. 5C, a plurality of light sources are positioned neighboring to the light entrance surface 101, and the middle point of the light entrance surface 101 is mainly decided by the closest light source, so different opening may have different middle point of the light entrance surface 101. For example, (1) for opening 110', the closest light source is light source 210', so the middle point M1 of the light entrance surface 101 is the intersection point of the normal from the middle point of the light emitting surface of the light-emitting element 210' and the light entrance surface 101; (2) for the opening 110, the closest light source is light source 210, so the middle point M2 of the light entrance surface 101 is the intersection point of the normal from the middle point of the light emitting surface of the light-emitting element 210 and the light entrance surface 101; (3) for the opening 110", the closest light source is light source 210", so the middle point M3 of the light entrance surface 101 is the intersection point of the normal from the middle point of the light emitting surface of the light-emitting element 210" and the light entrance surface 101. Therefore, each of the light leakage paths P1~P3 is respectively defined by (1) the center of base region of each opening 110', 110, 110" and (2) the corresponding middle point M1~M3 defined by its closest light-emitting element 210', 210, 210" where stronger light came from, so that the angles between the vertex centerline CL1~CL3 of the openings 110' 110, 110" and the light leakages path P1~P3 are respectively smaller than 90 degrees, i.e. zero degree in this embodiment.

Moreover, in an embodiment, as shown in FIGS. 3A and 3B, a plurality of first light source holes 130 are formed in the middle section of the light guide plate 10 (i.e. plate body 100). The light source unit 20 includes a plurality of light-emitting elements 210 arranged corresponding to and accommodated in the light source holes 130, respectively, so that the light entrance surface 101 for each light-emitting element 210 is an inner side wall of the plate body 100 within the corresponding light source hole 130, wherein the inner side wall is parallel to the Y-Z plane. Particularly, the first light source holes 130 penetrate the plate body 100 along the Z axis and are arranged along the Y direction to divide the plate body 100 into a left half portion and a right half portion. The openings 110 are distributed on two sides of the first light source holes 130 in the left and right half portions of the plate body 100. In this embodiment, fourteen first light source holes 130 are disposed in array along the X and Y axes on the middle section of the light guide plate 10, for example, two columns along the X axis (left column X1 and right column X2) and seven rows along the Y axis for each column X1, X2. The plurality of light-emitting elements (e.g. 14 LEDs) are accommodated in the first light source holes 130, respectively, so that the light enters into two half portions of the light guide plate 10 from the light entrance surface 101 of the corresponding light source hole 130. In this embodiment, the first light source hole 130 is a rectangular hole; for the left column X1, the light entrance surface 101 is the left side inner wall of the light source hole 130, and for the right column X2, the light entrance surface 101 is the right side inner wall of the light source hole 130. Each first light source hole 130 preferably accommodates one light-emitting element 210, so that the light-emitting elements 210 on the left column X1 emit light toward the left side inner wall, and the light-emitting elements 210 on the right column X1 emit light toward the right side inner wall. As such, the light provided by the light-emitting elements 210 enters the left and right half portions of the plate body 100 from the light source holes 130. After the light enters the light guide plate 10 from the light entrance surface 101, the light travels substantially along the X-Y plane toward left and right sides.

Figure 6A:
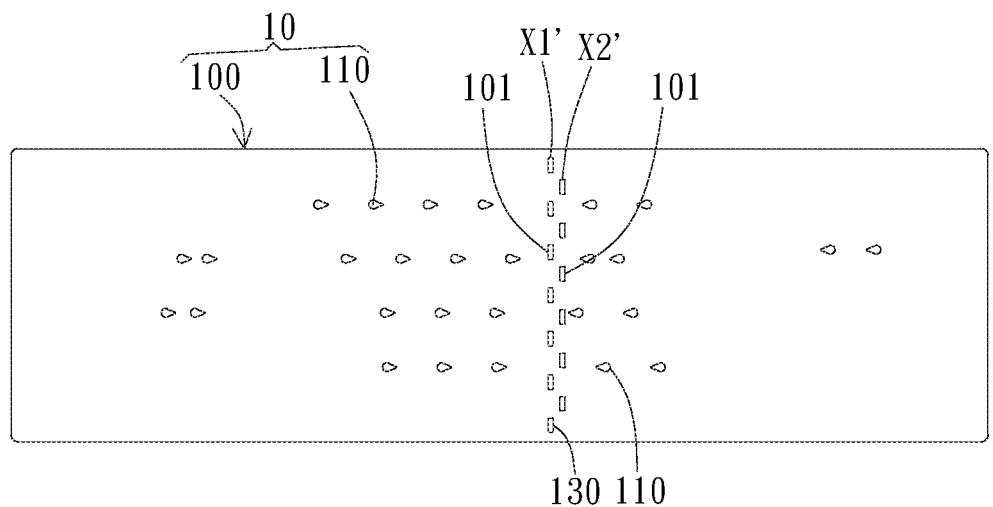
FIGS. 6A to 6C are schematic views showing the arrangement of the first light source hole of the light guide plate of different embodiments.
Figure 6B:
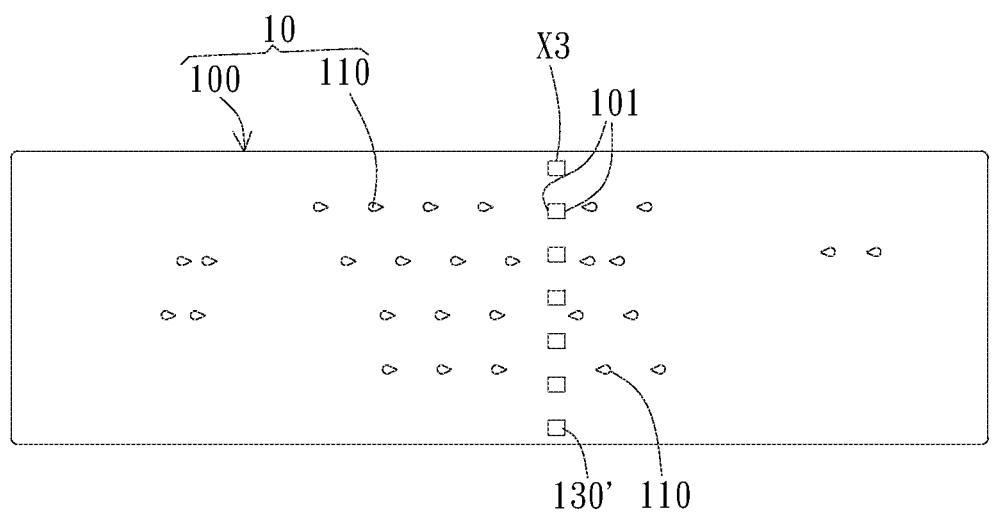
Figure 6C:
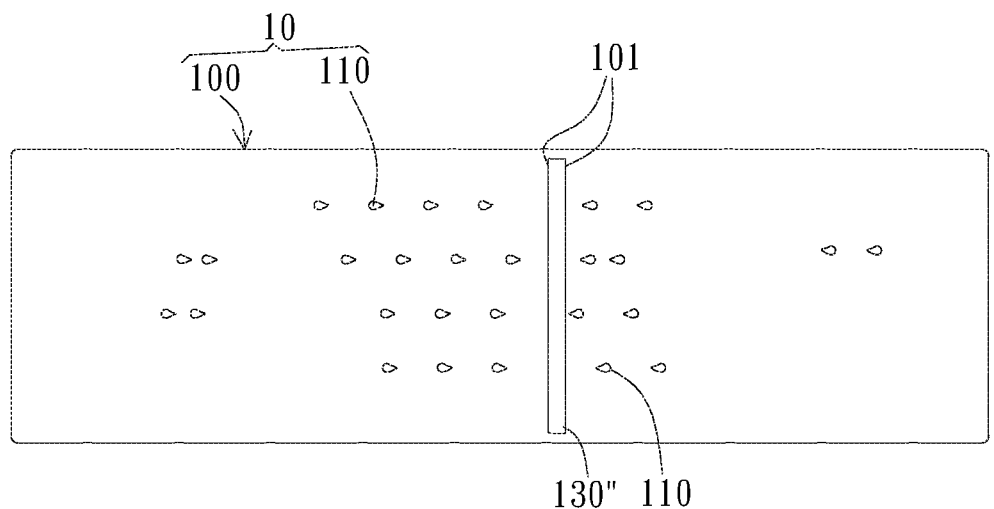

FIG. 3A illustrates the first light source holes 130 disposed as two symmetric columns X1, X2, but not limited thereto. In another embodiment, as shown in FIG. 6A, the first light source holes 130 can be disposed as two asymmetric columns X1', X2', and the number of light source holes 130 in the two columns X1', X2' can be the same or different. In another embodiment, as shown in FIG. 6B, the first light source holes 130' can be disposed only in a column X3, and some of the light-emitting elements in the first light source holes 130' can emit light toward the left half portion and some of them emit light toward the right half portion. Moreover, in another embodiment, as shown in FIG. 6C, the plurality of first light source holes can be integrated into only one first light source hole 130'''. It is noted that the first light source hole 130', 130" may have a larger size, so that at least two or more than two light-emitting elements 210 can be accommodated therein to emit light toward the left and right half portions of the plate body 100. In other words, when the light-emitting elements 210 are accommodated in the first light source hole 130', 130", the opposite side walls (left and right side walls) of the first light source hole 130', 130" are the light entrance surfaces 101 for the left and right half portions, respectively.

As shown in FIGS. 3A and 3B, the reflective layer 30 is disposed under the light guide plate 10 to reflect light that leaks from the bottom surface of the light guide plate 10 back to the light guide plate 10. The reflective layer 30 disposed under the plate body 100 can reflect the light energy back into the plate body 100, and the light energy then travels along the X-Y plane or emits out from the light exit surface 102. The reflective layer 30 can be a reflective film made of reflective material, such as metal foil, or a layer of reflective material coated on a non-reflective film. The shape and size of the reflective layer 30 preferably correspond to those of the plate body 100. The reflective layer 30 has a first through hole 310 aligned with the base region 112

(e.g. a circular shape), and a projection of the cone shape region 114 along the Z axis on the reflective layer 30 is at least partially outside the first through hole 310. Particularly, the first through hole 310 of the reflective layer 30 preferably corresponds to the heat dissipation hole or the screw hole of the keyboard, and the number and location of the first through holes 310 correspond to the openings 110 of the light guide plate 10. The first through hole 310 is preferably a circular hole. In an embodiment, taking the base region 112 as a circular hole for example, when the light guide plate 10 and the reflective layer 30 are stacked, the center of the base region 112 is preferably aligned with the center of the through hole 310, so that base region 112 is aligned with the first through hole 310, and the radius of the base region 112 is preferably substantially equal to or larger than the radius of the first through hole 310. When the base region 112 has other geometric shapes, the geometric center of the base region 112 is preferably aligned with the center of the first through hole 310. Moreover, the projection of the base region 112 of the opening 110 along the Z axis on the reflective layer 30 preferably covers the area of the first through hole 310, and the cone shape region 114 at least partially extends beyond the first through hole 310, so that the reflective layer 30 shields the portion of the cone shape region 114 that extends beyond the first through hole 310 from the bottom side.

The reflective layer 30 further has a second light source hole 320. The second light source hole 320 is aligned and communicates with the first light source hole 310. That is, in this embodiment, the second light source hole 320 and the first light source hole 130 preferably have the same amount, shape, and location and communicate with each other in a one-to-one manner, but not limited thereto. In another embodiment, the second light source hole 320 and the first light source hole 130 can be different in amount, shape, and location provided that if the light guide plate 10 and the reflective layer 30 are stacked, the overlapped portion of the first light source hole 130 and the second light source hole 320 can accommodate the light-emitting elements 210. As shown in FIG. 3B, when the light guide plate 10, the reflective layer 30, and the light source unit 20 are assembled, the opening 110 of the light guide plate 10 is aligned with the first through hole 310 of the reflective layer 30, and the light-emitting element 210 of the light source unit 20 can be inserted into the first light source hole 130 through the second light source hole 320 from the bottom side of the reflective layer 30. Moreover, since the base region 112 of the opening 110 is aligned with the first through hole 310, the reflective layer 30 shields at least a portion of the cone shape region 114.

In addition, the mask layer 40 is disposed on the light guide plate 10 and has a mask pattern to selectively locally block light or allow light to pass therethrough. The mask layer 40 can be a light-transparent optical film with pattern design to shield the keyboard where light is not desired. For example, the mask layer 40 can have a pattern corresponding to the arrangement of the keyswitches so as to block light emitting from the gap between adjacent keyswitches and allow light to emit from the keycaps of the keyswitches. In an embodiment, the shape and size of the mask layer 40 preferably correspond to the plate body 100. The mask layer 40 has a second through hole 410 aligned with the base region 112 of the opening 110 of the light guide plate 10 and the first through hole 310 of the reflective layer 30, and the projection of the cone shape region 114 of the opening 110 along the Z axis on the mask layer 40 is at least partially outside the second through hole 410.

The number, location, and shape of the second through holes 410 preferably correspond to the first through holes 310 of the reflective layer 30. In other words, the second through hole 410 is preferably a circular hole having the same radius as the first through hole 310. As shown in FIG. 3B, when the mask layer 40, the light guide plate 10, the reflective layer 30, and the light source unit 20 are assembled to form the backlight module 1, the center of the base region 112 (or the geometric center) is preferably aligned with the center of the first through hole 310 and the center of the second through hole 410, and the radius of the base region 112 is preferably substantially equal to or larger than the radius of the first through hole 310 and the radius of the second through hole 410. Moreover, the projections of the base region 112 along the Z axis on the reflective layer 30 and the mask layer 40 cover the area of the first through hole 310 and the area of the second through hole 410, respectively. The cone shape region 114 at least partially extends beyond the first through hole 310 and the second through hole 410, so that the reflective layer 30 and the mask layer 40 shield the portion of the cone shape region 114 that extends beyond the first through hole 310 and the second through hole 410 from the bottom side and the top side, respectively. The light-emitting element 210 of the light source unit 20 can be inserted into the first light source hole 130 through the second light source hole 320 from the bottom side of the reflective layer 30, and the mask layer 40 covers the light-emitting element 210 on the top. Moreover, in the case of the opening 110 being formed as a through hole, when the mask layer 40, the light guide plate 10, the reflective layer 30, and the light source unit 20 are assembled to form the backlight module 1, the first through hole 310, the base region 112 of the opening 110, and the second through hole 410 are aligned and communicate with each other to form an integral through hole, so that an external fixing unit (e.g. bolt, screw) can penetrate through the first through hole 310, the base region 112, and the second through hole 410 to mount the backlight module 1 on the electronic device.

Figure 7A:
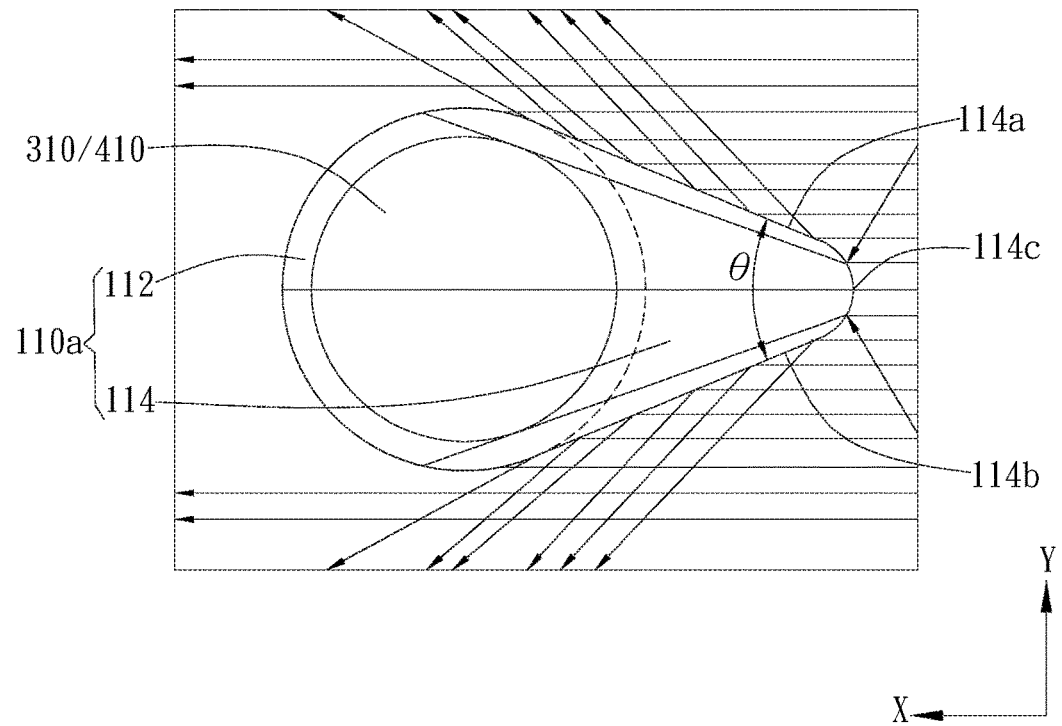
FIGS. 7A and 7B are respectively a cross-sectional view and a side view showing the light traveling in the backlight module of the invention.
Figure 7B:
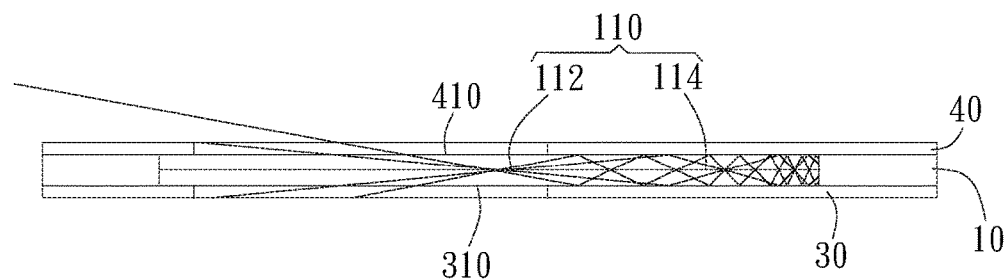

As shown in FIGS. 7A and 7B, with the taper-shaped cross section 110a of the opening 110, when the light that enters from the light entrance surface 101 and travels along the X axis direction encounters the two inclined edges 114a, 114b of the cone shape region 114, the light will be reflected away from the opening 110, so that the light entering the opening 110 is significantly decreased, so as to reduce the light leaking from the opening 110. Moreover, in the case of the opening 110 being formed as a through hole, the light entering the opening 110 can be repeatedly reflected and attenuated within the space encompassed between the mask layer 40 and the reflective layer 30 to further decrease the possibility of light leaking from the cone shape region 114 by using the mask layer 40 and the reflective layer 30 to respectively shield at least a portion of the cone shape region 114 from the top and bottom sides.

It is noted that the reflective layer 30 and the mask layer 40 are a first optical layer and a second optical layer disposed on two opposite sides of the light guide plate 10, wherein the first optical layer can be one of the reflective layer 30 and the mask layer 40, and the second optical layer can be the other of the reflective layer 30 and the mask layer 40. That is, when the first optical layer is the reflective layer 30, the second optical layer is the mask layer 40. Alternatively, when the first optical layer is the mask layer 40, the second optical layer is the reflective layer 30. In the above embodiment, the reflective layer 30 and the mask layer 40 are disposed on two sides of the light guide plate 10;

however, according to practical applications, the backlight module can optionally have only one of the reflective layer 30 and the mask layer 40 disposed on one side of the light guide plate 10.

Figure 8A:
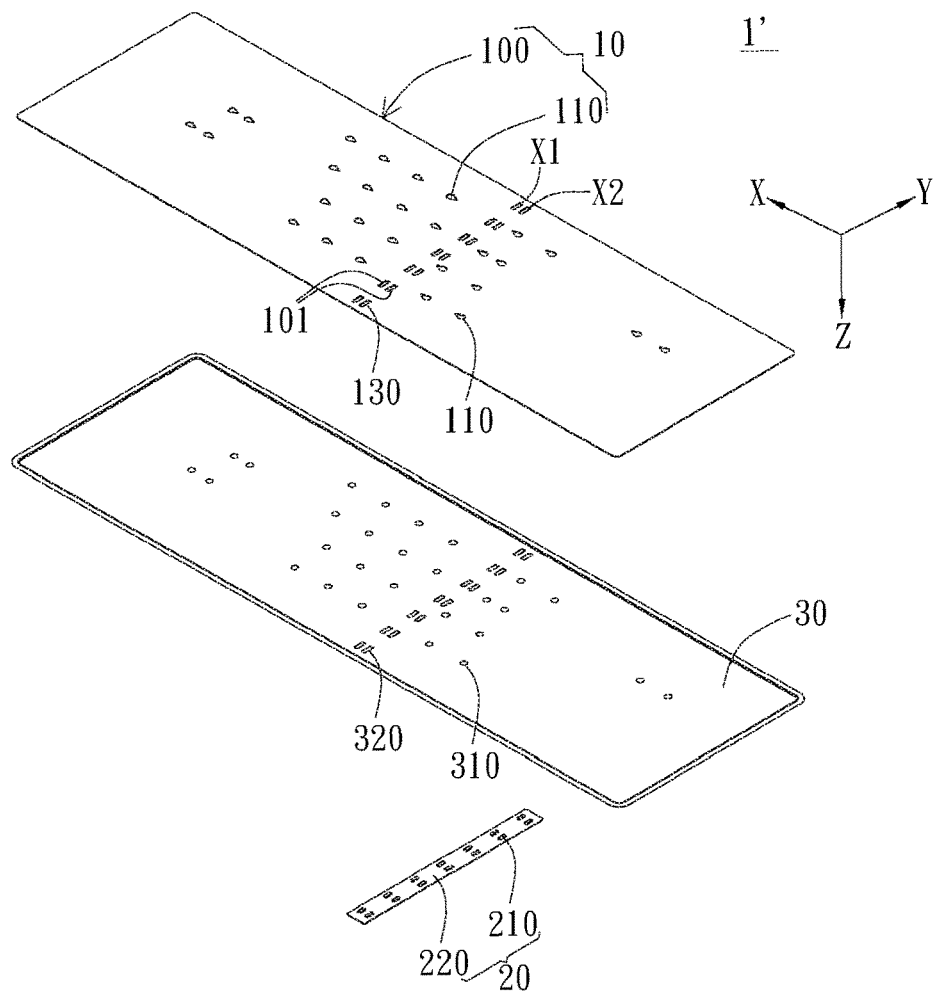
FIGS. 8A and 8B are respectively an exploded view and a partial cross-sectional view of the backlight module in another embodiment of the invention.
Figure 8B:
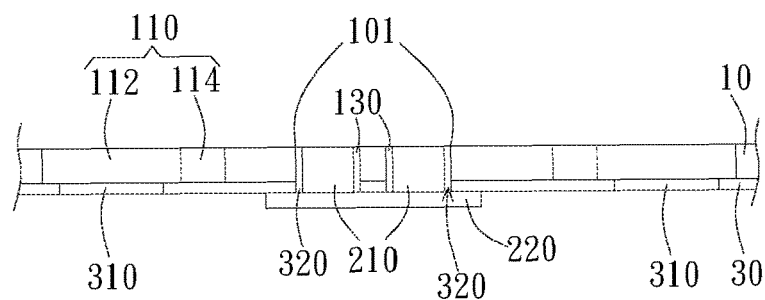
Figure 9A:
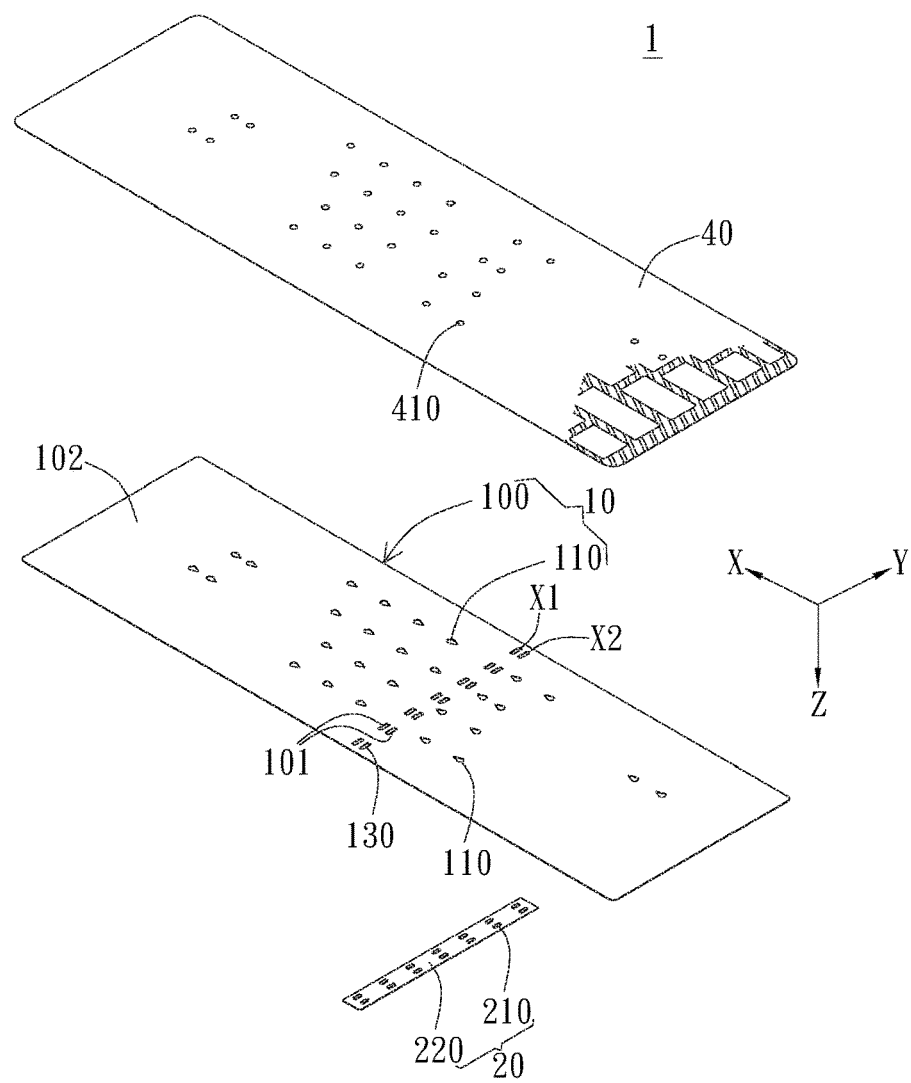
FIGS. 9A and 9B are respectively an exploded view and a partial cross-sectional view of the backlight module in another embodiment of the invention.
Figure 9B:
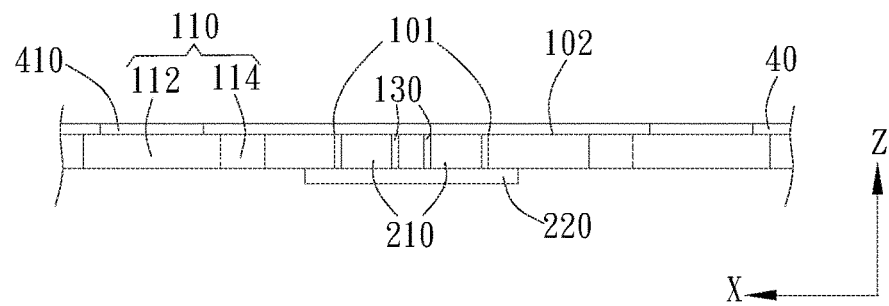

As shown in FIGS. 8A and 8B, in another embodiment, when the light leaking from the gap between the keycaps is negligible, the mask layer can be omitted from the backlight module. In other words, the backlight module 1' includes the light guide plate 10, the light source unit 20, and the reflective layer 30. For example, when the opening of the metal base plate of the keyswitch module 2 is formed right under the keycap, the gap between the keycaps is shielded from light by a certain width of the metal base plate, so that the backlight module 1' can be adopted. As shown in FIGS. 9A and 9B, in another embodiment, when the light energy leaking from the bottom of the backlight module is negligible, the reflective layer can be omitted from the backlight module. In other words, the backlight module 1" includes the light guide plate 10, the light source unit 20, and the mask layer 40. For example, when the housing or support structure of the laptop computer under the backlight module has high reflectivity, the backlight module 1" can be adopted. It is noted that the details of components and arrangement of the backlight module 1', 1" can refer to the above descriptions and will not elaborate hereinafter.

Figure 10A:
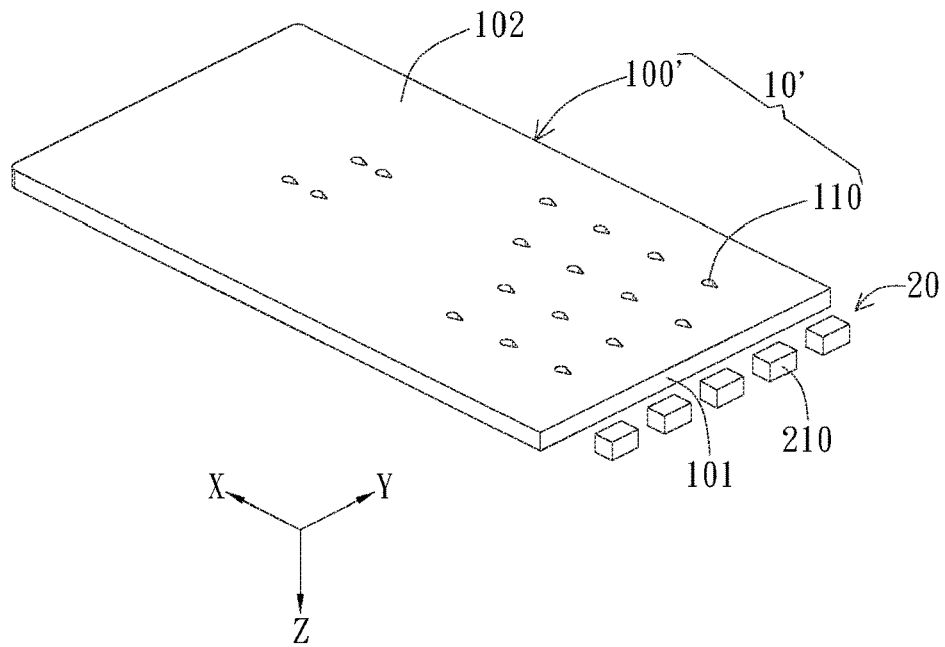
FIGS. 10A and 10B are respectively a perspective view and a top view of the light guide plate and the light source unit of another embodiment of the invention.
Figure 10B:
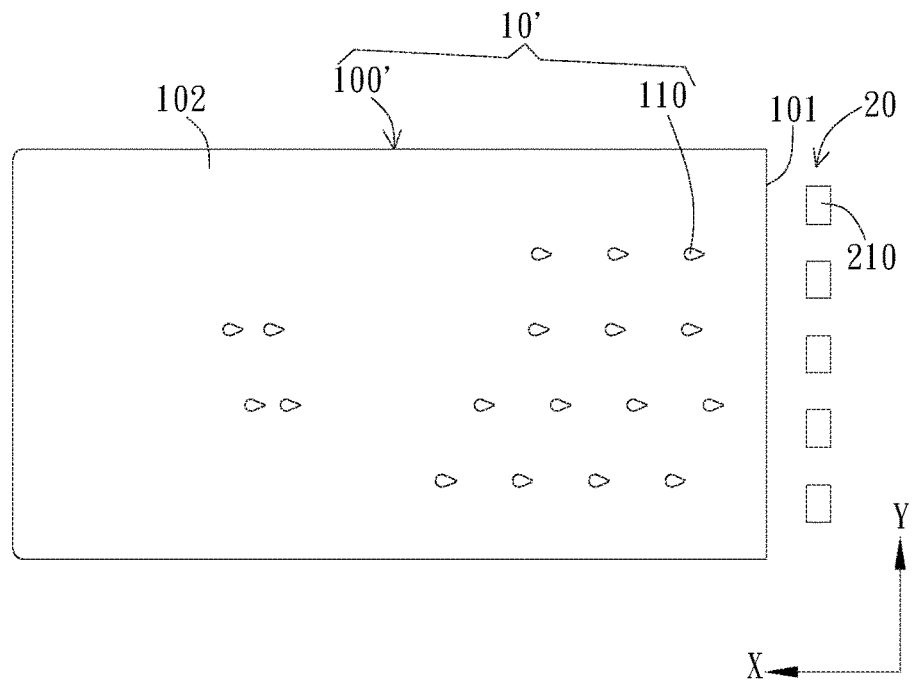

According to practical applications, the light guide plate can have different configurations. As shown in FIGS. 10A and 10B, in another embodiment, the plate boy 100' of the light guide plate 10' is a rectangular film extending substantially along the X-Y plane, wherein the light entrance surface 101 of the plate body 100' is preferably the side surface of the plate body 100', and the light exit surface 102 is the top surface adjacent to the light entrance surface 101. The light source unit 20 including a plurality of light-emitting elements 210 is disposed corresponding to the light entrance surface 101, wherein the light entrance surface 101 is the side plane extending along the Y-Z plane. In other words, the light guide plate 10' has the side surface of the plate body 100' as the light entrance surface 101, and no light source hole 130 is formed.

Figure 11A:
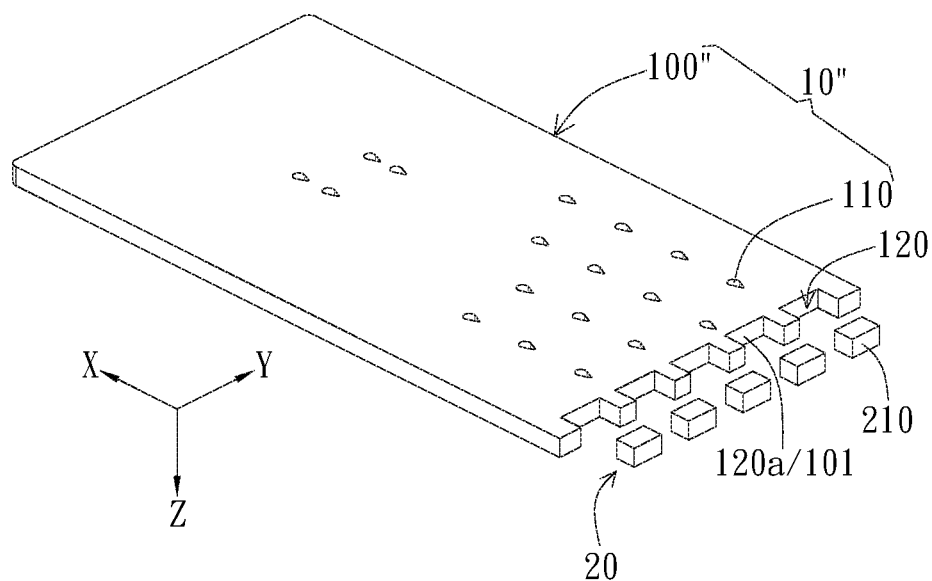
FIGS. 11A to 11C are perspective views and a top view of the light guide plate and the light source unit of another embodiment before/after assembly.
Figure 11B:
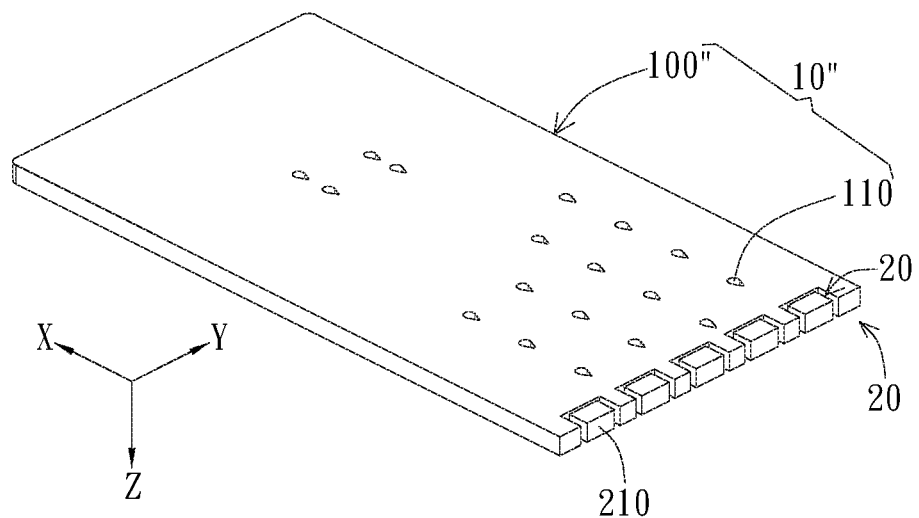
Figure 11C:
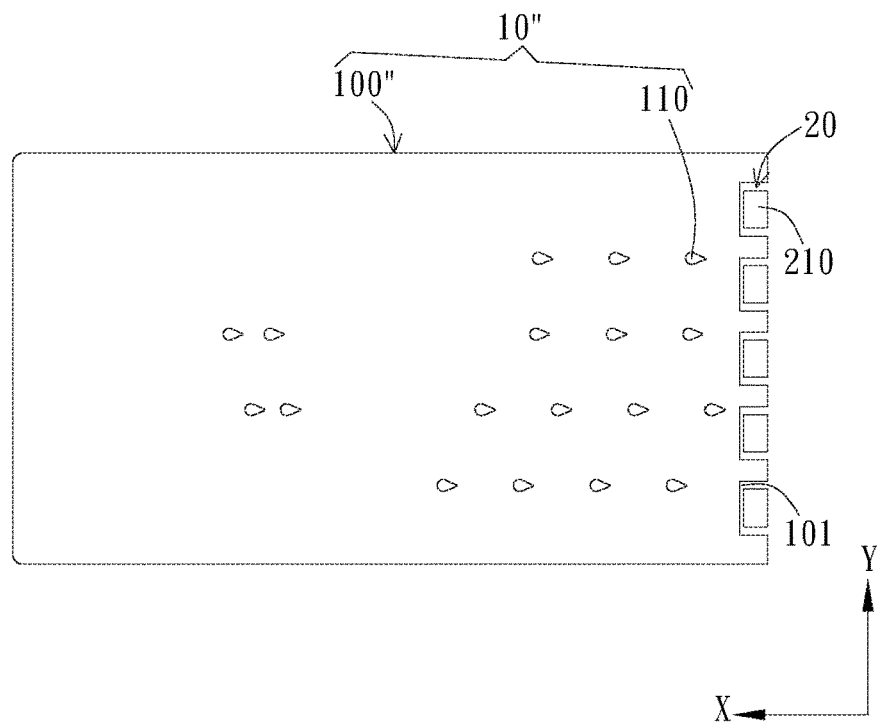

In other embodiments, the light guide plate may have different designs on the portions corresponding to the light source unit 20. As shown in FIGS. 11A to 11C, the light guide plate 10" has a concave structure corresponding to the light-emitting element 210 of the light source unit 20, so that the light-emitting element 210 can be accommodated in the groove 120. The groove 120 is a notch recessed toward the X axis direction from the side surface that extends along the Y-Z plane, so that the side wall 120a extending along the Y-Z plane within the groove 120 is the light entrance surface 101.

Figure 12:
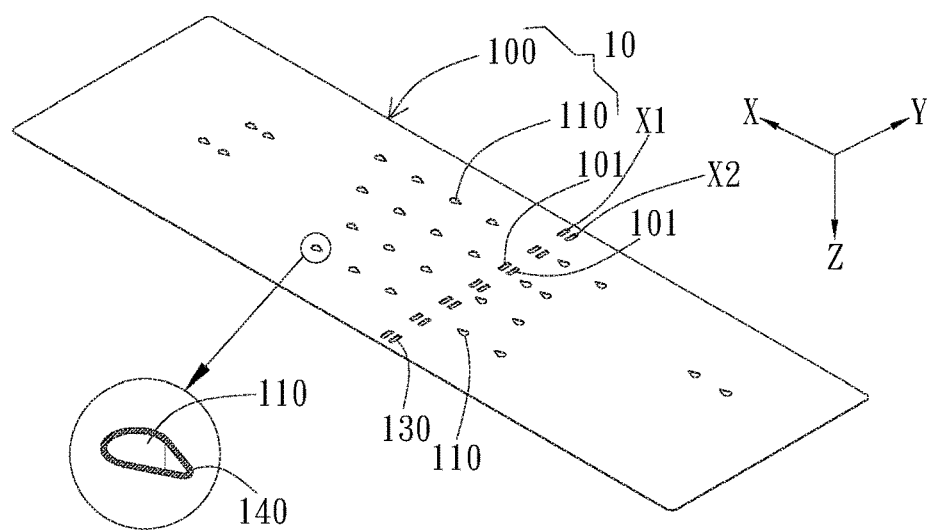
FIG. 12 is a schematic view of the light guide plate according to another embodiment of the invention.

As shown in FIG. 12, the light guide plate 10 further includes an ink layer 140. The ink layer 140 is coated on the plate body along the X-Y plane and surrounds the opening 110. That is, the ink layer 140 has a shape conformal to the taper-shaped cross section 110a of the opening 110 (i.e. droplet profile in this embodiment). The ink layer 140 is preferably coated on the light exit surface 102 of the plate body 100 along the outer rim of the base region 112 and the cone shape region 114 to surround the taper-shaped cross section 110a of the opening 110 on the light exit surface 102, so that light emitted from the opening 110 or nearby portion can be absorbed by the ink layer 140 to further reduce the light leaking from the opening 110.

Compared to the prior arts, the backlight module and the light guide plate of the invention has an opening that has a taper-shaped cross section parallel to the light exit surface can (1) significantly decrease the light that is refracted into the opening and (2) improve the light leakage from the opening by utilizing the mask layer and the reflective layer that shield the cone shape region from the top and bottom sides to absorb or reflect the light refracted into the opening, so that the brightness of the keyboard will be more uniform.

Although the preferred embodiments of the present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A backlight module, comprising:
a light source unit for providing a light;
a light guide plate for receiving the light, the light guide plate comprising:
a plate body substantially extending along an X-Y plane, a normal direction to the X-Y plane being a Z axis, the plate body having a light entrance surface, the light entering the light guide plate from the light entrance surface and traveling substantially along the X-Y plane; and
at least one opening formed in the plate body, the opening extending along the Z axis, a cross section of the opening on the X-Y plane being a taper shape and having a base region and a cone shape region, wherein the cone shape region extends from one side of the base region and is positioned between the light source unit and the base region; and
a first optical layer disposed on the light guide plate, the first optical layer having a first through hole aligned with the base region to allow heat dissipation or an external fixing unit to pass through the base region and the first through hole, wherein a projection of the cone shape region along the Z axis on the first optical layer is at least partially outside the first through hole, so the first optical layer at least partially covers the cone shape region, and
wherein a portion of the light passes through the cross section with the taper shape into the opening; the portion of the light then travels from the cone shape region toward the base region and is attenuated by the first optical layer, so the intensity of the light escaped from the base region is reduced.

2. The backlight module of claim 1, wherein the cone shape region has a vertex angle in a range of 30~45 degrees.

3. The backlight module of claim 1, wherein the base region has a central point; a straight line running through the central point and a middle point of the light entrance surface defines a light leakage path; the cone shape region has a vertex centerline; an included angle between the vertex centerline and the light leakage path is smaller than 90 degrees.

4. The backlight module of claim 1, further comprising a second optical layer disposed under the light guide plate, wherein the second optical layer has a second through hole aligned with the first through hole, a projection of the cone shape region along the Z axis on the second optical layer is at least partially outside the second through hole.

5. The backlight module of claim 4, wherein the first optical layer is a mask layer, and the second optical layer is a reflective layer.

6. The backlight module of claim 3, wherein the base region has a circular shape, the central point is the center of the circular shape; the light leakage path is defined by the straight line running through the center of the circular shape and the middle point of the light entrance surface.

7. The backlight module of claim 6, wherein the cone shape region includes two inclined edges and a vertex; the two inclined edges are substantially two tangent lines of the circular shape and the vertex is defined by the two inclined edges.

8. The backlight module of claim 1, wherein the light guide plate further comprises an ink layer; the ink layer is coated on the plate body along the X-Y plane and surrounds the opening along an outer rim of the base region and the cone shape region.

9. The backlight module of claim 5, wherein the light guide plate further comprises a first light source hole; the reflective layer further comprises a second light source hole being aligned and communicating with the first light source hole; the light source unit comprises a light-emitting element penetrating through the second light source hole and extending into the first light source hole.

10. The backlight module of claim 3, wherein the base region has an ellipse shape; the central point is the center of the ellipse shape; the light leakage path is defined by the straight line running through the center of the ellipse shape and the middle point of the light entrance surface.

11. The backlight module of claim 3, wherein the base region has a polygon shape with smooth vertices; the central point is the geometric center of the polygon shape; the light leakage path is defined by the straight line running through the geometric center of the polygon shape and the middle point of the light entrance surface.

12. The backlight module of claim 1, wherein the light guide plate further comprises a light source hole, wherein the light source hole is formed in the plate body for accommodating the light source unit; the light entrance surface is an inner side wall of the plate body within the light source hole.

* * * * *